United States Patent Office 3,131,407
Patented May 5, 1964

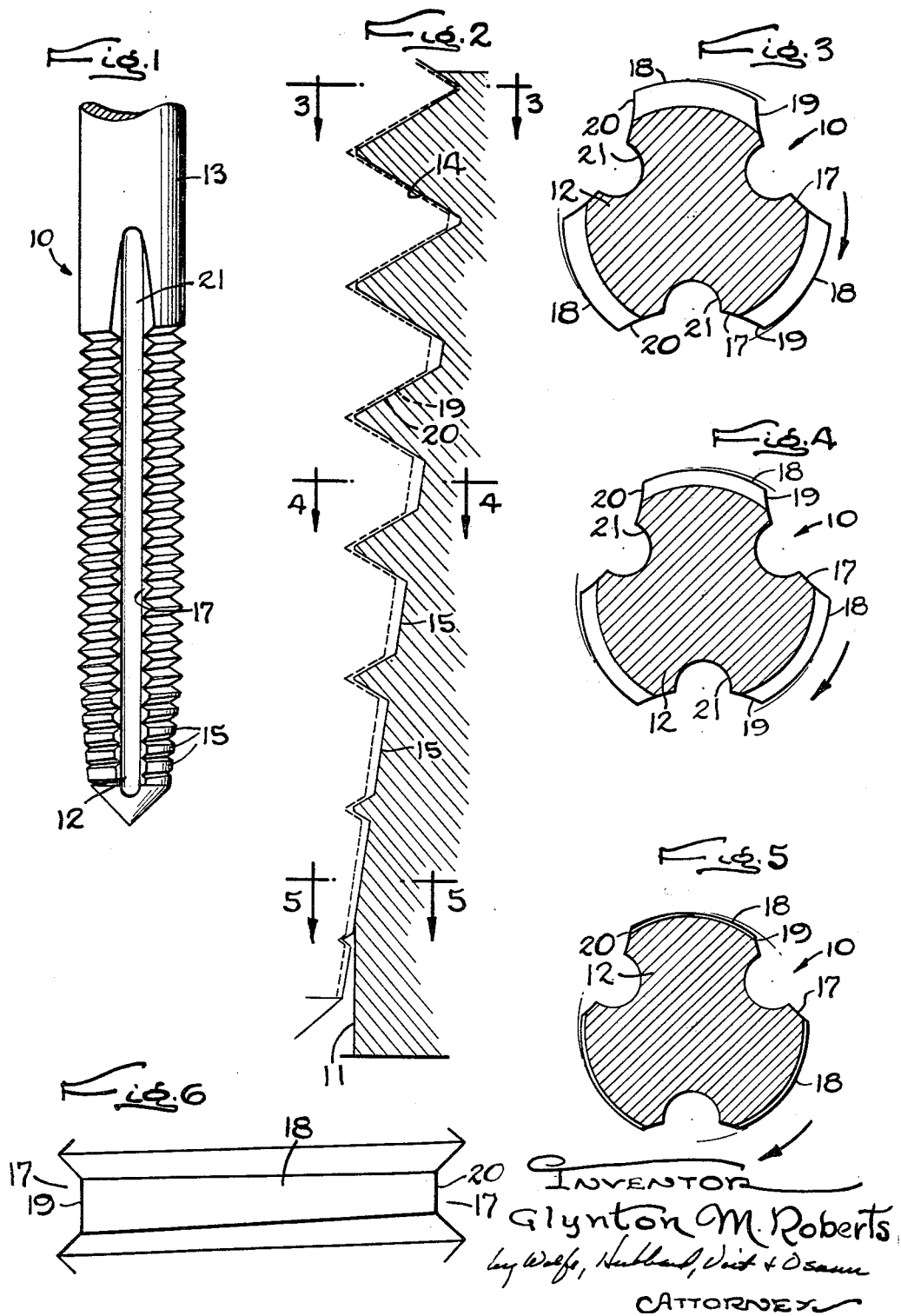

3,131,407
THREAD SWAGING TAP
Glynton M. Roberts, 1725 St. Lawrence, Beloit, Wis.
Filed Mar. 8, 1962, Ser. No. 178,414
4 Claims. (Cl. 10—152)

This invention relates to taps for forming internal threads in the walls of cylindrical holes of predetermined diameter and the general object of the invention is to provide a novel tap of the above character for forming threads having improved characteristics of wear resistance, strength, finish and accuracy.

A more specific object is to provide a tap which forms the entire thread with a pressing action rather than with a cutting or plowing action as in prior taps.

Another object is to provide a tap capable of pressing complete threads in relatively hard metals rapidly and without materially increasing the force required to drive the tap.

A further object is to trim and polish the thread during the withdrawal of the tap from the hole.

Still another object is to increase the strength of the tap by reducing the depth of the flutes therein or completely eliminating flutes without hampering the action of the tap.

Other objects and advantages of the invention will become apparent from the following detailed description taken in connection with the accompanying drawing, in which FIGURE 1 is a fragmentary side elevational view of a tap embodying the novel features of the present invention.

FIG. 2 is an enlarged fragmentary section taken through the axis of a tap in operative engagement with the wall of a hole being threaded.

FIG. 3 is a fragmentary sectional view taken along the line 3—3 of FIG. 2.

FIG. 4 is a fragmentary sectional view taken along the line 4—4 of FIG. 2.

FIG. 5 is a fragmentary sectional view taken along the line 5—5 of FIG. 2.

FIG. 6 is an enlarged fragmentary view of a rolled-out portion of the tap shown in FIG. 1.

As shown in the drawing for purposes of illustration, the invention is embodied in a tap 10 for forming an internal thread in the wall 11 (FIG. 2) of a cylindrical hole of predetermined diameter. Such taps preferably are composed of a hardened piece of tool steel and include a body 12 formed with an external thread beginning adjacent the leading end of the body and extending helically upwardly, as viewed in FIG. 1, toward the trailing end. A shank 13 integral with the body at the trailing end thereof is adapted to be inserted in and gripped by a rotary drive socket such as that of a tapping machine (not shown). In a manner well known in the art, the tap and the workpiece are rotated relative to each other as the tap advances axially relative to the work thereby to thread the hole.

The outside or major diameter of the tap thread is made larger than the diameter of the hole to be threaded so that the tap forms a helical groove 14 (FIG. 2) in the hole wall as the tap is turned and advanced into the hole, this groove constituting the internal thread to be formed and having a cross-sectional contour complementing the cross-section of the tap thread. Herein, the tap thread is shaped to form a V-shaped internal thread.

As shown most clearly in FIGS. 1 and 2, the leading end portion of the body is chamfered to taper toward the leading end from an outside diameter larger than the hole size to a point diameter at the first turn of the thread preferably smaller than the hole size thereby to facilitate entry of the tap into the hole. Such chamfering produces wide, flat crests 15 on the chamfered turns of the tap thread which preferably is ground almost to the root at the leading end of the first turn and reaches the full thread depth and outside diameter in the fourth turn. Accordingly, as the tap advances into the hole, each turn of the tap thread progressively increases the depth of the internal thread until the desired thread contour and full depth is reached.

One or more flutes 17 comprising axial grooves ground into the tap interrupt the tap thread and divide the latter into a plurality of generally circumferentially extending sections known as lands 18 (FIGS. 3 through 5) each having a leading end 19 and a trailing end 20 in one direction of rotation of the tap, this direction being indicated by the arrows in FIGS. 3 through 5. Herein, three such flutes are equally spaced around the tap and extend both above and below the threaded portion thereby providing passages for carrying cooling and lubricating fluid into the hole as the later is being threaded, and dividing the thread into three series of axially alined lands.

In accordance with the present invention, the tap is constructed in a novel manner such that the threads formed thereby have improved characteristics of wear resistance, strength, finish, and accuracy. For these purposes, the tap is constructed to form the entire thread by compressing the metal of the hole wall rather than by cutting away or plowing the metal out of the hole wall as has been the case with prior taps in commercial use. Accordingly, no chips are formed during threading and the thread surfaces comprise layers of cold forged and compacted metal having the aforesaid improved characteristics.

To achieve the foregoing, each land 18 is formed with reverse relief, that is, a gradually increasing radius from its leading end 19 toward its trailing end 20 (see FIG. 3), and the chamfer is applied in reverse so that each chamfered land also has an increasing radius from its leading end to its trailing end (FIGS. 4 and 5). Thus, as each land passes through the wall, the crest 15 of the land moves progressively further from the axis of the tap and gradually increases the depth of the groove by compressing the metal in the wall.

Tap threads with reverse relief may be produced on conventional machines in a manner that will be readily apparent to one skilled in the art. For example, when using a thread grinding machine, the wheel is dropped gradually toward the tap axis to lower the leading end portion of each land below the level of the trailing end as the grinding wheel is advanced along the land from the trailing end toward the leading end.

Preferably, the wheel starts to drop after passing the trailing end but before it has progressed more than one third of the way toward the leading end. Similarly, when the chamfer is applied, the wheel approaches the tap at an angle with the axis thereof sufficient to provide the desired taper of the chamfered portion, and is dropped toward the tap axis in moving from the trailing ends of one series of lands to the leading ends thereof. The resulting contour of the lands is shown in FIGS. 4 and 5 in which the original radius of each land is shown in broken lines and the finished radius of each chamfered land is shown in full lines. The lands on the first four turns have flat crests along their full length while the lands on two or three additional turns are partially flattened.

In the tapping operation, the leading end 19 of the first chamfered land makes a shallow and wide penetration of the hole wall and then presses progressively deeper into the wall as the land passes a given point in the wall. The leading end of the next land is disposed at a radius equal to or slightly less than the trailing end of the preceding land so that there is no cutting by the leading end. Each successive land increases the depth of the groove an amount determined by the increase in radius from the trailing end of the preceding land to the trailing end of the succeeding land. Most of the metal originally in the groove area is pressed radially outwardly by the flat crests of the lands to compact the metal adjacent the surface of the groove, and a small amount of the metal is cammed axially because of the increasing axial width of the lands at a given radius (see FIG. 6). This action is illustrated most clearly in FIG. 2 in which the tap cross-section shown in full lines is taken through trailing portions of the lands and the cross-section shown in broken lines represents the leading portions of the lands. Preferably, the minor diameter of the tap thread is approximately the same as the diameter of the hole to be formed since none of the metal of the wall is plowed out to form the crest of the thread formed in the hole.

As a result of the reverse chamfer, the axial width of the crest 15 of each chamfered land narrows as the radius of the land increases, this being illustrated in FIG. 2. It will be seen, therefore, that the pressure applied radially in the groove is applied against an area that decreases as the crest presses deeper. Consequently, the driving force required to turn the tap remains substantially constant, and because the metal is cammed gradually inwardly as the land radii increase, the force required is little, if any, greater than is required with conventional cutting taps.

Flutes are not necessary in taps of this type because no cutting edges are required at the leading ends 19 of the lands. To form the tap without flutes, the thread-grinding wheel is set up to drop inwardly from a given radius while passing along a predetermined portion of the periphery of the tap blank and then to move back to the maximum radius at a given point along the periphery, these in-and-out movements of the wheel occurring a predetermined number of times during each revolution of the blank to produce the desired number of lands per turn of the tap thread. It will be evident that the strength of a tap formed without flutes is substantially greater than the same tap with metal removed to form flutes.

In production work, however, it may be desirable to use a tap having one or more flutes for carrying coolant and lubricant into the hole being threaded. These flutes may be substantially shallower than those used in cutting taps since the hooked cutting edges required in such taps are not necessary in a thread-pressing tap. In the present instance, the flutes are quite shallow and include narrow oil grooves 21 enlarging the fluid passage while requiring the removal of only a small amount of metal. Thus, the strength of the tap, with or without flutes, is materially increased as compared to cutting taps.

Removal of workpieces from the tap may be accomplished either by stringing the workpieces on the shank 13 of the tap or by backing them off the tap. In the latter instance, the ends 20 of the lands which trailed during tapping become the leading ends and, being higher, polish the surface of the pressed thread. Threads pressed in most metals often have a slightly fuzzy finish and the metal tends to spring back partially toward its original shape. By forming a relatively sharp edge on the higher end 20 of each land, the tap is adapted to trim the thread smooth and to the proper size thereby insuring a fine and accurate thread finish. This relatively sharp edge may be formed when the flutes 17 are ground into the tap.

From the foregoing, it will be apparent that a tap formed in accordance with the present invention produces completely presed threads without the formation of chips and with the advantages in strength and wear resistance resulting from the nature of the compressed metal surfaces. These advantages are achieved simply by lowering the leading ends 19 of the lands and gradually increasing the land radii toward the trailing ends 20, and by applying the chamfer in reverse so that the chamfered lands also increase in radius from their leading ends to their trailing ends while the crests thereof decrease in axial width. The result is a tap which rapidly produces an improved thread and may be used in relatively hard metals such as hardened stainless steel.

This is a continuation in part of my copending application Serial No. 108,222 now abandoned.

I claim as my invention:

1. A tap for pressing threads in internal surfaces, said tap including, in combination, a body adapted to be rotated in a predetermined direction, a helical thread formed on said body, said body including a portion on which said thread is of a predetermined outside diameter and a tip portion on which the outside diameter of said thread tapers toward the tip, means dividing said thread into a plurality of generally circumferentially extending lands each having a leading end and a trailing end in said predetermined direction of tap rotation, the cross-section of each of said lands at any given radius of said body tapering in axial width from the trailing end toward the leading end of the land, and flat crests on the lands on said tip portion each being disposed at a gradually increasing radius from its leading end toward its trailing end to form pressing surfaces, the leading end of each of said crests being disposed at a radius not greater than the maximum radius of the preceding crest.

2. A tap as defined in claim 1 in which the crest radii increase gradually along approximately two-thirds of the crest length.

3. A tap as defined in claim 1 in which the root diameter of said thread is substantially constant and the leading end of the crest closest to said tip is disposed at a radius close to the radius of the thread root.

4. A tap as defined in claim 1 in which the leading end of each of said crests is disposed at a radius slightly less than the maximum radius of the trailing end portion of the preceding crest.

References Cited in the file of this patent

UNITED STATES PATENTS

| | | |
|---|---|---|
| 686,278 | Fette | Nov. 12, 1901 |
| 1,912,517 | De Lapotterie | June 6, 1933 |
| 2,703,419 | Barth | Mar. 8, 1955 |

FOREIGN PATENTS

| | | |
|---|---|---|
| 63,336 | Sweden | Feb. 25, 1922 |
| 1,143,802 | France | Apr. 15, 1957 |